United States Patent [19]

Isogai et al.

[11] Patent Number: 4,586,791
[45] Date of Patent: May 6, 1986

[54] OPTICAL MODULATION ELEMENT WITH SURFACE PARALLEL AND UNIDIRECTIONAL ALIGNMENT OF LC

[75] Inventors: Masato Isogai, Hitachi; Kishiro Iwasaki, Hitachiohta; Fumio Nakano, Hitachi, all of Japan

[73] Assignee: Hitachi, Ltd., Tokyo, Japan

[21] Appl. No.: 482,640

[22] Filed: Apr. 6, 1983

[30] Foreign Application Priority Data

Apr. 7, 1982 [JP] Japan ................... 57-56545

[51] Int. Cl.$^4$ .................. G02F 1/13; C09K 19/56; C09K 19/22
[52] U.S. Cl. .................. 350/341; 252/299.4; 252/299.68; 350/347 V; 350/350 S
[58] Field of Search .......... 252/299.01, 299.4, 299.68; 350/346, 347 R, 347 V, 341, 350 S

[56] References Cited

U.S. PATENT DOCUMENTS

| 3,647,280 | 3/1972 | Klein et al. | 252/299.01 X |
| 3,716,289 | 2/1973 | Creagh et al. | 252/299.01 X |
| 3,923,683 | 12/1975 | Oh et al. | 252/299.68 |
| 3,926,502 | 12/1975 | Tanaka et al. | 252/299.01 |
| 3,941,901 | 3/1976 | Harsch | 427/108 |
| 4,108,793 | 8/1978 | Castellano et al. | 252/299.01 X |
| 4,149,413 | 4/1979 | Gray et al. | 252/299.63 X |
| 4,195,916 | 4/1980 | Coates et al. | 252/299.01 X |
| 4,196,974 | 4/1980 | Hareng et al. | 252/299.4 X |
| 4,219,225 | 8/1980 | Raynes | 252/299.01 X |
| 4,227,778 | 10/1980 | Raynes | 252/299.01 X |

FOREIGN PATENT DOCUMENTS

| 32362 | 7/1981 | European Pat. Off. | 252/299.68 |
| 54-101338 | 8/1979 | Japan | 252/299.4 |
| 54-101339 | 8/1979 | Japan | 252/299.4 |
| 54-107353 | 8/1979 | Japan | 252/299.4 |
| 135919 | 8/1982 | Japan | 252/299.4 |
| 899536 | 1/1982 | U.S.S.R. | 252/299.68 |

OTHER PUBLICATIONS

Kondo, et al., "Prep. of Monodomain Cells . . . " Jap. Jour. Appl. Phys., vol. 20, No. 10, Oct. 1981, pp. 1773-1777.

Ishikawa, et al., "A Practical Method of Prep. Thin Homogeneous Ferroelectric . . . ", Jap. J. Appl. Phys. V. 23, No. 4, Apr. 1984, pp. L-211-213.

Patel et al., "Alignment for Smectic Liq. Cryst." Ferroelectrics, 1984, vol. 00, p. 000.

Japanese Journal of Applied Physics: vol. 22(5) 1983, L294-L296, Kondo, et al., "Surface Induced Helix . . . ".

Vol. 22(2) 1983, L85-L87, Kondo, et al., "A Practical Method . . . ".

(List continued on next page.)

Primary Examiner—Teddy S. Gron
Assistant Examiner—Catherine S. Kilby
Attorney, Agent, or Firm—Antonelli, Terry & Wands

[57] ABSTRACT

A liquid crystal optical modulation element is disclosed. The modulation element comprises two transparent substrates positioned so as to face each other; a transparent electrode provided on the facing surface of the transparent substrates; a transparent insulating/orientation control layer provided on each of the facing surfaces of the transparent electrodes, having insulating properties and orientating the liquid crystal molecules in the proximity thereof in a preferential direction substantially parallel to the surfaces of the substrates; a liquid crystal layer exhibiting ferroelectricity, sandwiched between the insulating/orientation control layers; and means for polarizing light passing through said liquid crystal layer.

The liquid crystal optical modulation element of the present invention is produced by the steps of coating transparent electrodes onto transparent sbstrates; coating polyimide films so as to cover the transparent electrodes; rubbing the polyimide coating films; positioning the transparent substrates parallel to each other so that the rubbed polyimide coating films face each other so that a liquid crystal cell is thereby assembled; introducing a liquid crystal exhibiting ferroelectricity into the cell thus formed and sealing the cell; and providing polarizers on the external surfaces of the substrates.

7 Claims, 6 Drawing Figures

E > E_c     E = 0     E > E_c

OPTICAL MODULATION ELEMENT WITH SURFACE PARALLEL AND UNIDIRECTIONAL ALIGNMENT OF LC

BACKGROUND OF THE INVENTION

1. Field of the Invention

This invention relates to a liquid crystal optical modulation element using a ferroelectric.

2. Description of the Prior Art

Liquid crystal optical modulation elements using nematic liquid crystals or smectic liquid crystals have been known in the past. Liquid crystal optical modulation elements (i.e., modulators) using nematic liquid crystals include those which use the guest-host effect (Japanese Pat. No. 653,723), those which utilize a dynamic scattering mode (DSM: Japanese patent publication No. 21,729/1970), those which utilize a twist structure molecular orientation (Japanese Patent Laid-Open No. 11,737/1972), and so forth. Liquid crystal optical modulation elements using smectic liquid crystals include those which utilize a thermo-optical effect (F. J. Kahn: Appln. Phys. Lett. 22, 111 (1973). However, none of these liquid crystal elements are free from the problem of a low response speed.

To solve this problem of the low response speed, an optical modulation system having a quick response speed which makes use of a ferroelectric liquid crystal layer as been proposed (European Patent Laid-Open No. 32,362). This liquid crystal layer exhibiting a ferroelectricity was announced by R. B. Meyer et al (R. B. Meyer et al: J. Physics 36 L-69 (1975)). It is believed that when a liquid crystal layer has a helical crystal structure and the liquid crystal molecules are arranged at an inclination to the helical axis, the central symmetry collapses, thereby producing the ferroelectricity. Chiral smectic C phase and chiral smectic H phase are known as liquid crystal phases having the structure described above, and several liquid crystal compounds exhibiting a ferroelectricity have been synthesized using the chiral smectic C and H phases (Ph. Martinot-Lagarde: J. Physique 37, C3-129 (1976)).

On the basis of the principle described above, the intensity of light can be modulated by changing the intensity and direction of the electric field. According to the above European Patent Laid-Open No. 32,362, the helical structure of the liquid crystal is loosened when the thickness d of the liquid crystal layer is sufficiently reduced so that two stable states of molecular orientation, that is, the initial orientation state and a state in which an electric field exceeding a certain critical value $E_c$ is applied, can be obtained. In accordance with this system, it has been reported that one stable state can be changed over to the other stable state by applying an electric field of approximately $10^5$ V/cm for a period of several micro-seconds.

However, in practice it is impossible on an industrial basis to reduce the gap between the liquid crystal layers sufficiently, the above European Patent Laid-Open No. 32,362 does not provide an orientation film between them. In order to orient the liquid crystal molecules without the orientation film, however, either a shearing stress or a magnetic field must be applied, as described in this prior art reference. Accordingly, this system can not be mass-produced, and hence has no practical value.

SUMMARY OF THE INVENTION

It is therefore an object of the present invention to provide a liquid crystal optical modulation element having a high response speed, and a method of producing such an element. The present invention is particularly directed to provide an optical modulation element exhibiting electro-optical characteristics that are different from those of heretofore known optical modulation elements using a liquid crystal layer exhibiting a ferroelectricity.

To accomplish the objects described above, the first invention of this application provides a liquid crystal optical modulation element which includes two transparent substrates positioned so as to face each other; a transparent electrode provided on the facing surface of the transparent substrates; insulating orientation control layers provided on each of the facing surfaces of the transparent electrodes, having insulating properties and orientating the liquid crystal molecules in the proximity thereof in a preferential direction substantially parallel to the surfaces of the substrates; a liquid crystal layer exhibiting a ferroelectricity sandwiched between the insulating orientation control layers; and means for polarizing light passing through the liquid crystal layer. A polyimide film, a polyamide film, a polyvinyl alcohol film, etc., can be used as the insulating orientation control layers and these control layers may each be divided into an insulating layer and an orientation control layer.

According to one aspect of the present invention, there is provided a liquid crystal modulation element wherein the thickness of the liquid crystal layer is such that the helical axis formed by continuous arrangement of liquid crystal molecules is formed between the orientation control layers.

At least one of the substrates can be made of a polarizing material.

The modulation element of the present invention may be manufactured by a method of producing a liquid crystal optical modulation element which involves the steps of coating a transparent electrode onto one surface of each of two transparent substrates; coating polyimide films so as to cover the transpatent electrodes; rubbing these polyimide films; arranging the transparent substrates parallel to each other so that the polyimide films thus rubbed face each other to assemble a liquid crystal cell; introducing a liquid crystal exhibiting a ferroelectricity into the cell and then sealing the cell; and providing polarizers on the external surfaces of the substrates.

The liquid crystal exhibiting a ferroelectricity consists principally of the following Schiff's base liquid crystals, which may be used either alone or in combinations. They can also be used in combination with other liquid crystal materials.

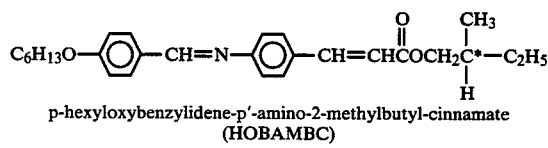

p-hexyloxybenzylidene-p'-amino-2-methylbutyl-cinnamate (HOBAMBC)

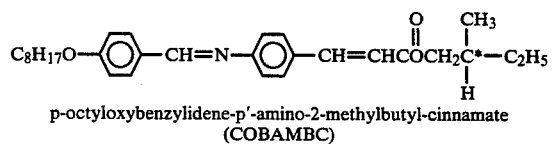

p-octyloxybenzylidene-p'-amino-2-methylbutyl-cinnamate (COBAMBC)

-continued

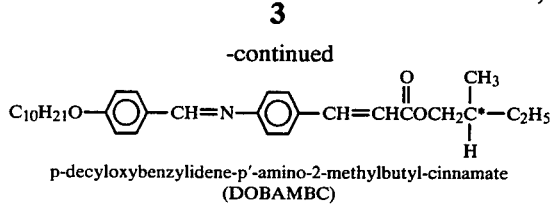

p-decyloxybenzylidene-p'-amino-2-methylbutyl-cinnamate
(DOBAMBC)

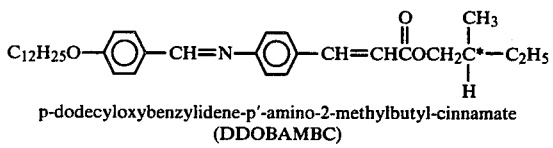

p-dodecyloxybenzylidene-p'-amino-2-methylbutyl-cinnamate
(DDOBAMBC)

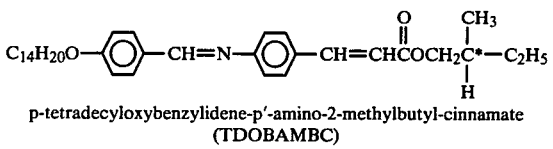

p-tetradecyloxybenzylidene-p'-amino-2-methylbutyl-cinnamate
(TDOBAMBC)

BRIEF DESCRIPTION OF THE DRAWINGS

FIG. 3(2) is a schematic view of the relation between the axis of polarization and the director of the liquid crystal molecules;

DESCRIPTION OF THE PREFERRED EMBODIMENTS

Figure 1:
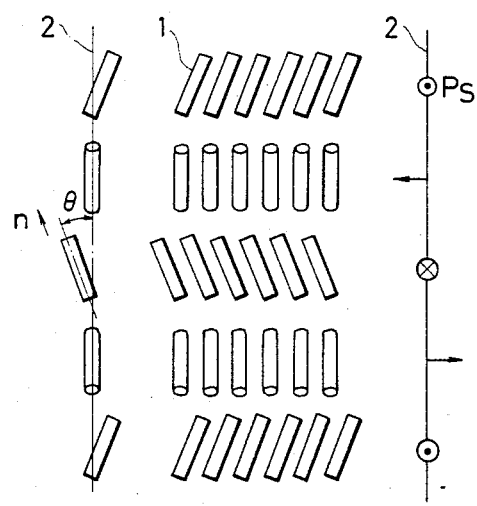
FIG. 1 is a schematic view of the crystal structure of a liquid crystal used in the present invention.
Figure 2:
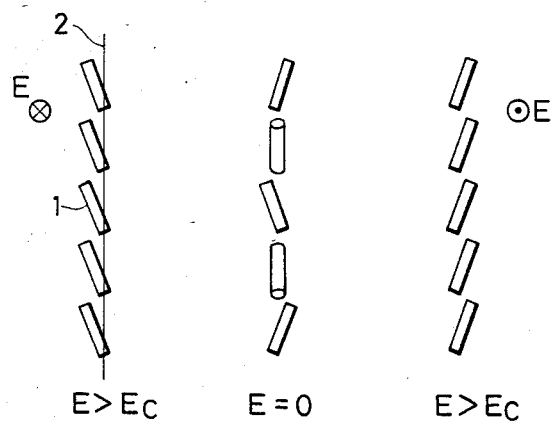
FIG. 2 is a schematic view of the response of the liquid crystal of FIG. 1 to an electric field.

FIG. 1 schematically illustrates the structure of the ferroelectric chiral smectic C phase. The liquid crystal molecules 1 are arranged so as to be inclined at an angle $\theta$ to the helical axis 2. This liquid crystal layer has a laminar structure having a thickness corresponding to approximately one molecule, and the direction of inclination of all the liquid crystal molecules in a layer is the same. The liquid crystal molecules can move relatively freely within the layer. The spontaneous polarization P tends to be in a direction which is perpendicular to the plane defined by a director n representing the direction in which the liquid crystal molecules are viewed macroscopically and the helical axis 2, and rotates around the helical axis 2. As shown in FIG. 2, when an electric field is applied to the liquid crystal in a direction perpendicular to the helical axis 2, the spontaneous polarization P attempts to align itself in the direction of the electric field E so that a torque is generated in the liquid crystal molecules. When the electric field is increased to a level exceeding a certain critical value $E_c$, the helical structure is completely loosened, and all the liquid crystal molecules point in the same direction. Here, the change in direction of orientation of the liquid crystal molecules 1 eventually varies with the direction of the electric field E, as shown in FIG. 2. This change only affects the liquid crystal molecules within a layer, the laminar structure itself remains unchanged. Accordingly, this change takes place in a relatively low electric field, and has the characteristic that its response time is short.

Figure 3:
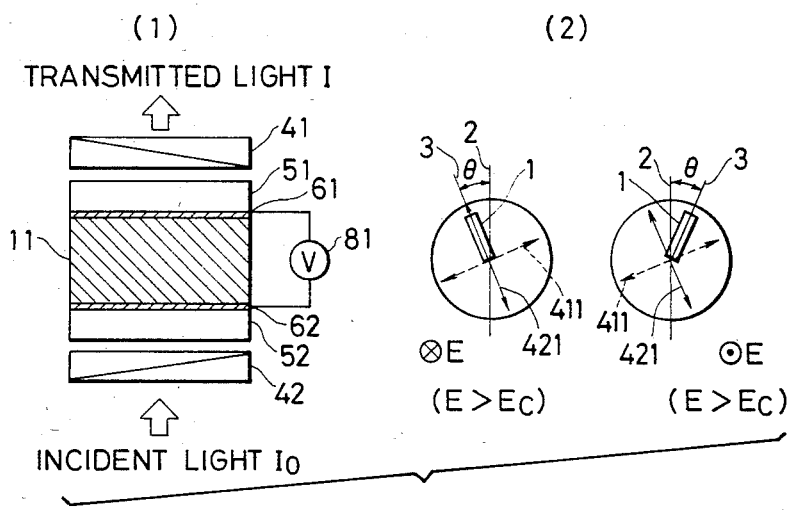
FIG. 3(1) is a sectional view explaining the principle of a light modulation element using the liquid crystal described above.

The principle of the optical modulation element using such a ferroelectric liquid crystal will be explained with reference to FIG. 3. First, a magnetic field or a mechanical force is applied as shown in FIG. 3(1) so that the helical axis of the ferroelectric liquid crystal 11 is aligned in a certain specific direction parallel to substrates 51 and 52. The liquid crystal 11 is then sandwiched between the substrates 51 and 52 to which transparent electrodes 61, 62 applying the electric field to the liquid crystal are coated, respectively. Two polarizers 41, 42 whose axes of polarization are crossed are positioned on the external surfaces of the substrates 51, 52, respectively. An electric field E exceeding the critical value $E_c$ is applied using a power source 81 so that the directors 3 of the liquid crystal molecules are aligned in the same direction, as shown in FIG. 3(2), and either one of the axes of polarization 411 and 421 of the two polarizers 41, 42 (the axis of polarization 421 in this drawing) is in agreement with the directors 3 of the liquid crystal molecules. In this instance, the intensity I of the transmitted light is zero when the intensity of the incident light is $I_o$ and that of the transmitted light is I.

Next, when the direction of the electric field is reversed, the liquid crystal molecules are aligned in the reverse direction to that described above. In other words, the directors of the liquid crystal molecules deviate by an angle $2\theta$ from the axis of polarization 421 when $\theta$ is the angle of the directors of the liquid crystal molecules to the helical axis 2. As a result, light is passed due to birefringence. The intensity I of the transmitted light in this case is given by the following equation:

$$I = \frac{I_o}{2} \sin^2 4\theta \sin^2\left(\pi \cdot \frac{\Delta n \cdot d}{\lambda}\right) \tag{1}$$

where $\Delta n$ is the optical anisotropy of the liquid crystal, d is the thickness of the liquid crystal layer and $\lambda$ is the wavelength of the light.

Since the transmitted light depends upon the wavelength of the light as can be seen from the equation above, it is generally seen colored.

Figure 4:
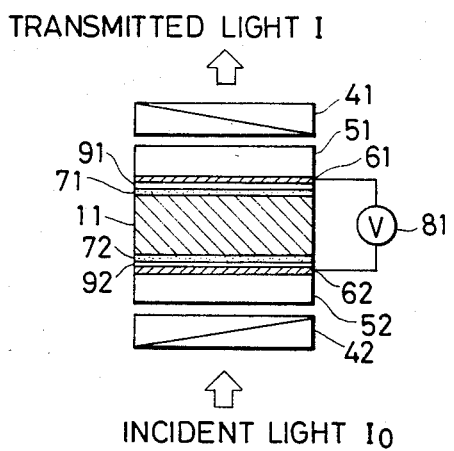
FIG. 4 is a sectional view of one embodiment of the present invention.

FIG. 4 shows one embodiment of the first invention of this application. In the drawing, like reference numerals are used to identify similar constituents to those in FIG. 3(1) and the explanation of these constituents is omitted.

As shown in FIG. 4, insulation/orientation control layers are sandwiched between the ferroelectric liquid crystal 11 and the transparent electrode 61 and between the liquid crystal 11 and the transparent electrode 62. These insulation/orientation control layers consist of orientation control layers 71, 72 that are positioned so as to be in contact with the liquid crystal 11 and insulation layers 91, 92 that are interposed between the orientation control layers 71, 72 and the transparent electrodes 61, 62, respectively. These insulation/orientation control layers can be formed by single layers of a polyimide film having the properties of controlling its insulating properties as well as the orientation of the liquid crystal molecules. When the incident light is polarized, the polarizer 42 may be omitted. Furthermore, the polarizers do not need to be spaced apart from the substrates but may be formed on them. The polarizers themselves can be used as the substrates, and a reflection type of optical modulation element can be obtained by providing a reflecting plate on a substrate.

The principle of the optical modulation in this embodiment is the same as that shown in FIG. 3(1). Hence, the modulation width is given as $(I_o/2) \sin^2 4\theta \sin^2 (\pi \Delta n \cdot d/\lambda)$ from equation (1). To increase this modulation width, a material having a value of $\theta$ close to $\pi/8$ is preferably used. To modulate the intensity of monochromatic light, it can be increased by selecting the phase delay value $\Delta n \cdot d/\lambda$ to be $n + \frac{1}{2} (n = 0, 1, 2, \ldots)$. When a display device is required, the display contrast is at a maximum and the coloring is reduced if the value of the phase delay $\Delta n \cdot d/\lambda$ is approximately $\frac{1}{2}$. If $\Delta n \cdot d/\lambda$ is approximately 2, the color display becomes sharper. For these reasons, it is preferable to adjust the thickness d of the liquid crystal layer, or to select suitable materials in accordance with the intended application.

Next, an embodiment of the second invention of this application for producing the optical modulation element described above will be described. First, indium oxide and tin oxide (ITO), transparent electrodes were provided on transparent substrates made of glass, and a PIQ (trade name by Hitachi Chemicals Ltd.; polyimide isoindoloquinazolinedione) film was then provided on each transparent substrate over the ITO transparent electrodes and was rubbed in a predetermined direction. The construction was carried out by coating a solution of NMP (N-methyl-2-pyrrolidone) containing 3.5% PIQ onto the substrates in a spinner at approximately 3,500 r.p.m., and they were then baked at 250° C. for one hour. The film was approximately 800 Å thick in this case.

Figure 5:
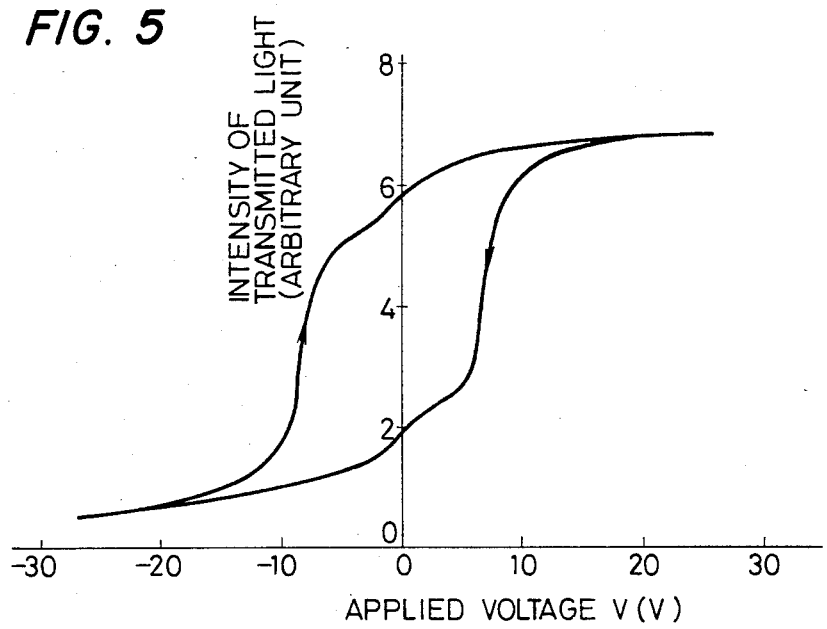
FIGS. 5 and 6 are diagrams showing the characteristics of the embodiment of FIG. 4.

The two substrates were then arranged so that their rubbing directions were parallel to each other and a 6 μm thick layer of glass fiber was sandwiched between them as a spacer to assemble the liquid crystal cell, the liquid crystal was then vacuum-sealed. Previously described DOBAMBC was used as the liquid crystal material. After the liquid crystal was sealed, the cell was heated to its isotropic liquid temperature and gradually cooled (at a rate of 0.5° C./min) to the chiral smectic phase at which the ferroelectricity were exhibited. In this way, a modulation element having uniform helical axes was obtained. Incidentally, it has been found that when an a.c. square wave of $10^4$ V/cm, 1 KHz was applied when the liquid crystal was in the chiral smectic C phase, an element having a uniform orientation can be obtained. The liquid crystal element thus obtained was clamped between two polarizers and after the axis of polarization was orientated as shown in FIG. 3(2), the electro-optical characteristics were measured. The I-V characteristic curve showing the relation between the intensity of the transmitted light and the voltage when a triangular electric field of 0.01 Hz with a voltage amplitude of 25 V was applied is illustrated in FIG. 5. A white light source was used as the light source and the temperature at which DOBAMBC exhibited ferroelectricity was measured to be 79° C.

As shown in FIG. 5, the I-V characteristic curve is a hysteresis curve, but its mode of change is the reverse of that of the usual hysteresis curve. In other words, when the voltage is reduced, the change starts to occur at about 10 V and is substantially finished at about 0 V. On the other hand, when the voltage is increased, the change in the intensity of the transmitted light starts at about −10 V and becomes saturated at 0 V. This characteristic can only be obtained when insulating layers are sandwiched between the electrodes and the liquid crystal, and can be changed by adjusting the thickness of the insulating layers and by selecting a suitable resistivity of the materials. This phenomenon is assumed to result from the fact that the phase of the electric field applied to the liquid crystal is more advanced than that of the electric field applied to the element as a whole because of the presence of the insulating layers.

Figure 6:
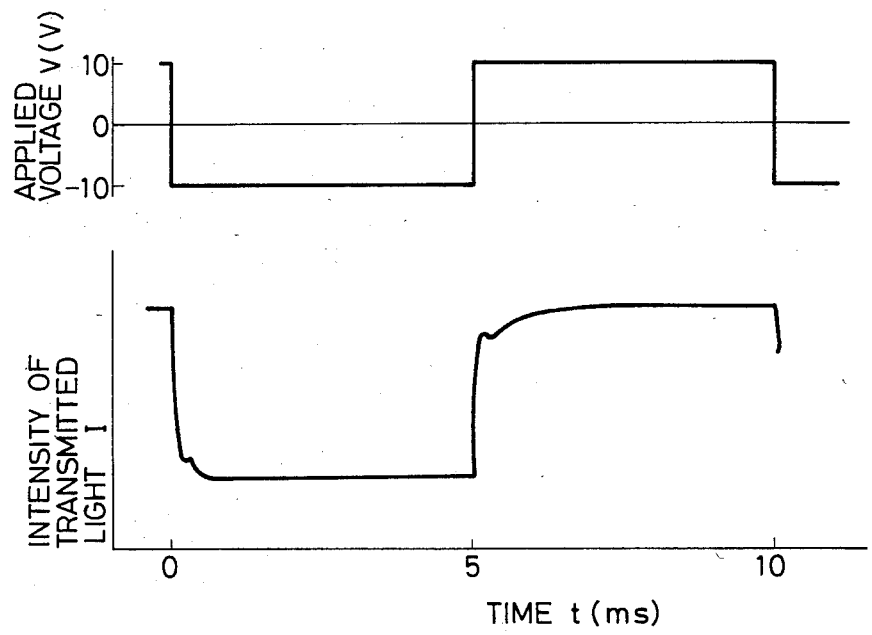

FIG. 6 shows the results of the measurement of the change in intensity of the transmitted light of the optical modulation element of this embodiment when a square wave of 10 V, 100 Hz was applied. The measuring temperature was 79° C. and the light was from a white light source. As shown in the figure, the element converts the 100 Hz signal to a light signal reasonably faithfully. If the response time is defined as the time from the start of change of the electric signal until the time when the intensity of the light is $\frac{1}{2}$ of the modulation width, this time is approximately 80 μs.

As described in the foregoing, the present invention provides the effects that the response time is shorter than in optical modulation elements using nematic liquid crystals, and characteristics are obtained that are different from the characteristics of conventional optical modulation elements using liquid crystals exhibiting ferroelectricity.

What is claimed is:

1. A liquid crystal optical modulator comprising:
   two transparent substrates positioned so as to face each other;
   a transparent electrode provided on the facing surface of each of said transparent substrates;
   a transparent insulating/orientation control layer provided on each of the facing surfaces of said transparent electrodes, for orientating the liquid crystal molecules adjacent thereto in a substantially single predetermined direction, which single predetermined direction is substantially parallel to the surfaces of said substrates, said insulating/orientation control layers being directionally rubbed and made of a member selected from the group consisting of polyimide films, polyamide films and polyvinyl alcohol films;
   a liquid crystal layer exhibiting a ferro-electricity, sandwiched between said insulating/orientation control layers; and
   means for polarizing light passing through said liquid crystal layer.

2. The liquid crystal optical modulator as defined in claim 1, wherein said insulating/orientation control layers each comprise a transparent orientation control layer disposed on the side of said liquid crystal layer, for orientating the liquid crystal molecules adjacent thereto in a substantially single predetermined direction, which single predetermined direction is substantially parallel to the surface of said substrates, and a transparent insulating layer interposed between said orientation control layer and the corresponding transparent electrode.

3. The liquid crystal optical modulator of claim 1 or 2, wherein said ferroelectric liquid crystal layer is a member selected from the following Schiff's base liquid crystals:

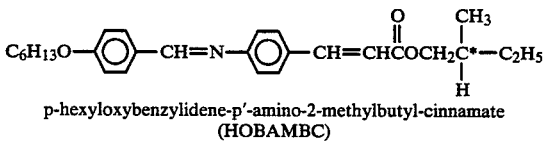

p-hexyloxybenzylidene-p'-amino-2-methylbutyl-cinnamate
(HOBAMBC)

-continued

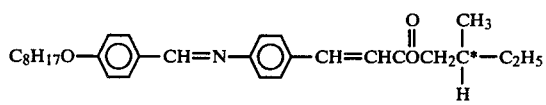

p-octyloxybenzylidene-p'-amino-2-methylbutyl-cinnamate
(COBAMBC)

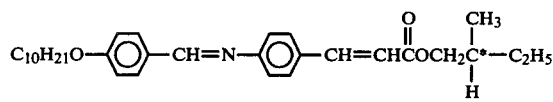

p-decyloxybenzylidene-p'-amino-2-methylbutyl-cinnamate
(DOBAMBC)

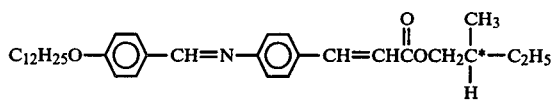

p-dodecyloxybenzylidene-p'-amino-2-methylbutyl-cinnamate
(DDOBAMBC)

-continued

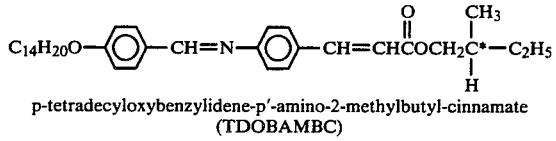

p-tetradecyloxybenzylidene-p'-amino-2-methylbutyl-cinnamate
(TDOBAMBC)

4. The liquid crystal optical modulator of claim 1, wherein the means for polarizing light includes two polarizers, with one at each side of the liquid crystal layer, the two polarizers being positioned such that their axes of polarization cross each other.

5. The liquid crystal optical modulator of claim 1, wherein the insulating/orientation control layers are each formed of two sub-layers, an orientation control sub-layer positioned to be in contact with the liquid crystal and an insulating sub-layer interposed between each orientation control sub-layer and the adjacent transparent electrode.

6. The liquid crystal optical modulator of claim 1 or 2, wherein said insulating/orientation control layers are formed of polyimide isoindoloquinazolinedione.

7. A liquid crystal optical modulator of claim 1, wherein the insulating/orientation control layers are positioned such that the predetermined directions in which each insulating/orientation control layer was rubbed are parallel to each other.

* * * * *